(12) United States Patent
Lloyd et al.

(10) Patent No.: US 7,016,857 B1
(45) Date of Patent: Mar. 21, 2006

(54) METHOD AND DEVICE IMPLEMENTING A SEAMLESS USER/SERVICE RESERVATION NETWORK

(75) Inventors: Scott A. Lloyd, Chandler, AZ (US); David S. McInally, Scottsdale, AZ (US); Michael W. Smeester, Mesa, AZ (US)

(73) Assignee: Advanced Network and Database Systems, Scottsdale, AZ (US)

(*) Notice: Subject to any disclaimer, the term of this patent is extended or adjusted under 35 U.S.C. 154(b) by 0 days.

(21) Appl. No.: 09/272,922

(22) Filed: Mar. 19, 1999

(51) Int. Cl.
*G06F 17/60* (2006.01)

(52) U.S. Cl. .......................... 705/5; 709/219
(58) Field of Classification Search ................ 705/5–9; 707/1–10; 709/200–253; 719/311
See application file for complete search history.

(56) References Cited

U.S. PATENT DOCUMENTS

| | | | |
|---|---|---|---|
| 4,788,643 A | 11/1988 | Trippe et al. ............... 364/407 |
| 4,931,932 A | 6/1990 | Dalnekoff et al. .......... 364/407 |
| 5,093,813 A | 3/1992 | Levine ........................ 368/10 |
| 5,319,548 A * | 6/1994 | Germain ...................... 700/92 |
| 5,596,636 A | 1/1997 | Davies et al. ............... 379/216 |
| 5,724,520 A | 3/1998 | Goheen ....................... 395/205 |
| 5,732,398 A * | 3/1998 | Tagawa ........................ 705/5 |
| 5,764,981 A | 6/1998 | Brice et al. ................. 395/671 |
| 5,781,892 A * | 7/1998 | Hunt et al. ................... 705/5 |
| 5,832,451 A * | 11/1998 | Flake et al. ................... 705/5 |
| 5,832,454 A | 11/1998 | Jafri et al. .................... 705/6 |
| 5,864,818 A | 1/1999 | Feldman ....................... 705/5 |
| RE36,346 E * | 10/1999 | Germain .................... 700/411.1 |
| 6,496,930 B1 * | 12/2002 | Ono et al. ................... 713/168 |

OTHER PUBLICATIONS

Arnold "Online Tee Times" Google Groups Apr. 20, 1998 pp. 1-3.*

* cited by examiner

*Primary Examiner*—William Thomson
*Assistant Examiner*—Charles Anya
(74) *Attorney, Agent, or Firm*—Blackwell Sanders Peper Martin LLP

(57) ABSTRACT

A method device implementing a seamless user/service reservation network. A network is establishing having a user input module, an interface module and a vendor service module. The user input module accommodates different classes of potential users including golf reseller, an Internet based user and a dedicated function user. Regardless of the type of user input is targeted for, all user inputs accept the same input format and send all transactions via a bundled communication. The interface module comprises multiple servers designed to communicate with the user input module and the vendor service module and decode and process all bundled requests. Utilizing multi-thread processing, all transactions from either module are concurrently processed. The vendor service module incorporates multiple vendor systems running different software platforms. Each vendor software platform is linked with a dedicated network server that can accordingly translate all standard communications to the specific protocol of the individual software vendor. By incorporating multiple user inputs that are processed concurrently by multiple vendors running different software platforms the seamless golf reservation network establishes a standardized golf tee time reservation system unique to this industry.

16 Claims, 7 Drawing Sheets

| Field Name | Size | Description |
|---|---|---|
| Segment | x | Header segment. |
| Orig_sys | x | Letter code for originating system. |
| Message_id | x | Alpha numeric string to identify the specific transaction. |
| Orig_time | x | Time stamp when transaction originated. |
| Resp_time | x | Time stamp when system responded. |
| User_id | x | Character ID of user who initiated the transaction. |

Example: GOLFA| AWV| XXXXXXXX| XXXXXXXXXXXXXXX| 19920101| 19990102| MAU

FIG. 6.

METHOD AND DEVICE IMPLEMENTING A SEAMLESS USER/SERVICE RESERVATION NETWORK

BACKGROUND OF THE INVENTION

1. Field of Invention

This application is entitled to priority pursuant to a provisional application filed Mar. 16, 1999 entitled METHOD AND DEVICE IMPLEMENTING A SEAMLESS USER/SERVICE RESERVATION NETWORK.

In general, this invention relates to a seamless reservation network and more specifically, to a seamless user/service reservation network enabling multiple user interfaces to concurrently access multiple vendor reservation systems running different software reservation platforms.

2. Description of Related Art

In general, the prior art discloses networked systems which provide a user access to golf tee times reservation software. For each of these prior art systems, a user must adopt and implement the specific communication and information protocols defined by each system. Additionally, each individual vendor golf course must purchase and implement the software prepared by the golf reservation network provider. Accordingly, if a golf course implements a reservation software platform different from the software utilized by the network, the prior art reservation network cannot include that particular golf course on the network because of the incompatibility of software. Additionally, because golf courses will typically run only one software reservation system per course, the prior art reservation systems suffer the drawback that they are limited solely to the specific golf courses that choose to run their specific software.

Currently, there are several golf tee time resellers, such as travel agencies, that desire to have the capability to meet customer demand by allowing a customer access to all or a majority of the golf tee time reservation networks. To accomplish this goal, these travel agencies must implement and be proficient in each of the plurality of different prior art reservation software systems currently available. For example, if there are currently 13 different tee time or other reservation systems available on the market, a travel agency wishing to have access to all the golf courses located on each system would need to purchase and become proficient in the specific transactional language and function protocol of each of the 13 individual reservation systems. Thus, if a client wished to book multiple tee times on different golf courses found of different reservation networks, the travel agency would have to establish a communication link to each separate golf course network using the particular software provided by the network and base all transactions on the specific protocols implemented by each system. Although each transaction may be functionally the same, i.e., reserving a tee time, the travel agency has to manually translate each transaction separately into the specific format supported by the particular network. Accordingly, based on the prior art systems, the only manner in which a travel agency may provide clients with the opportunity to reserve various tee times on separate reservation networks is for the agency to serve as both a translational and a communication hub.

Because of consumer demand, travel agencies have adopted the inefficient reservation method of running multiple software reservation options. However, as applied to the individual user wishing to make reservations on multiple golf course reservations, the limitations of the prior art are more extensive. It would be highly impractical for the individual user to have the system resources and training necessary to access a plurality of different software reservation platforms. Thus, the end user is typically limited to participating in at most one golf tee time reservation network only.

Some non-related industry prior art reservation systems allow a user, such as a travel agency, to communicate with multiple individual reservation systems. One such system, the THISCO System, is utilized in conjunction with additional software to reserve hotel rooms which are controlled by various reservation networks. To process a request on the THISCO system, a user must interface with its own non-standard communications and interfacing software to a central switch provided by the THISCO System which, in turn, communicates to the individual hotel reservation networks.

Because of its fundamental structure, the THISCO system can only process a single transaction per each communication. Accordingly, a user wishing to reserve multiple hotel rooms or to inquire about multiple hotel room availability must do so as separate, independent transactions. Although the THISCO system can establish a communication link with different network reservation systems, transactions to different systems cannot be processed concurrently, forcing the travel agency to engage the system multiple times and redo the entire reservation process each time. This multiple engagement becomes inefficient, especially in a situation in which a user must inquire on the availability of several potential reservation options and perform a reservation transaction on one or more of the systems. Additionally, because the THISCO system offers no user interface, each potential user must endure the construction and cost of a compatible interface. While some travel agencies endure such a cost as a result of market demand, individual users would not have the same capacity.

Accordingly, there exists a need for a seamless user/service reservation system which incorporates the transactions necessary to book a golf tee time reservation, can accommodate multiple user inputs designed for the target user, can accommodate a communication protocol such that the system can communicate with any vendor reservation network or individual vendor reservation software platform, and can facilitate the concurrent processing of a plurality of requests to different software platforms.

SUMMARY OF THE INVENTION

Based on the above noted deficiencies in the related art, it is an object of the present invention to provide a seamless user/service reservation network which can establish a communication protocol that is capable of interfacing with a plurality of different reservation systems. It is another object of the present invention to provide a graphical interface that allows a user access to multiple vendor reservation systems via the same single interface procedure. It is yet another object of the present invention to provide a seamless user/service reservation network that allows the user to issue multiple concurrent transactions to multiple vendor reservation systems within a single communication. It is a further object of the present invention to provide a communications protocol that allows the user to communicate with the seamless interface network irrespective of, and via multiple forms of entry, including an Internet web application, a graphical user interface, and additional interfaces. Finally, it is an object of the present invention to provide a method of doing business that allows a single user/service reservation network to facilitate multiple input methods accessing multiple vendor reservation systems via a single transactional template.

These and other objects of the present invention are achieved as a method, device, and system for implementing a seamless user/service reservation network having three primary components: an input module; an interface module; and a vendor service module.

The input module includes a plurality of potential embodiments, including a graphical user interface, an Internet web site interface and a plurality of dedicated single use computer interfaces. The input module allows a registrant to access the network via typical input means such as mouse, keyboard or voice commands. Regardless of the type of interface the user attempts to access, the user interface processes all transactions in the same manner. Thus, the user interface varies the display format of the input means to correspond with and accommodate the needs of the particular type of user, while keeping transaction protocol standardized.

The interface module serves the dual function of a transaction switch and an information dissemination system. Utilizing a multi-threaded process input means, the interface module processes multiple user transactions bundled into a single communication and concurrently divides and processes each transaction. The interface module communicates with both the user input module and the vendor service module accepting and sending communications to each module. Implementing a dedicated server communication format, the interface module facilitates communication irrespective of the individual embodiments of the other modules. Because of the multi-thread, multiple server configuration, the interface module facilitates concurrent processing of all bundled communications.

The vendor service module establishes a communication link with the interface module and responds to user transactions. Because its transactions are conducted through the interface module, and because all user inputs incorporate the same protocol, the vendor service module processes all transactions irrespective of the embodiment of user input.

Combined, the system of the present invention provides the golf reservation industry with a complete network capable of connecting multiple user inputs having bundled transactions to multiple vendor systems running different software reservation platforms.

BRIEF DESCRIPTION OF THE DRAWINGS

The objects and features noted above are explained in more detail with reference to the drawings, in which like reference numerals are used to indicate like parts in the various views:

FIG. 6 is an example of the preferred communication protocol of the present invention;

DETAILED DESCRIPTION OF THE PREFERRED EMBODIMENT

The present invention relates to a method of implementing a seamless user/service reservation network capable of establishing a concurrent communication link between multiple users and multiple vendor reservation systems. Additionally, the present invention also relates to a method of business providing a golf reservation system that reduces all input transactions into a single, common interface which is relayed to multiple vendor interfaces.

Figure 1:
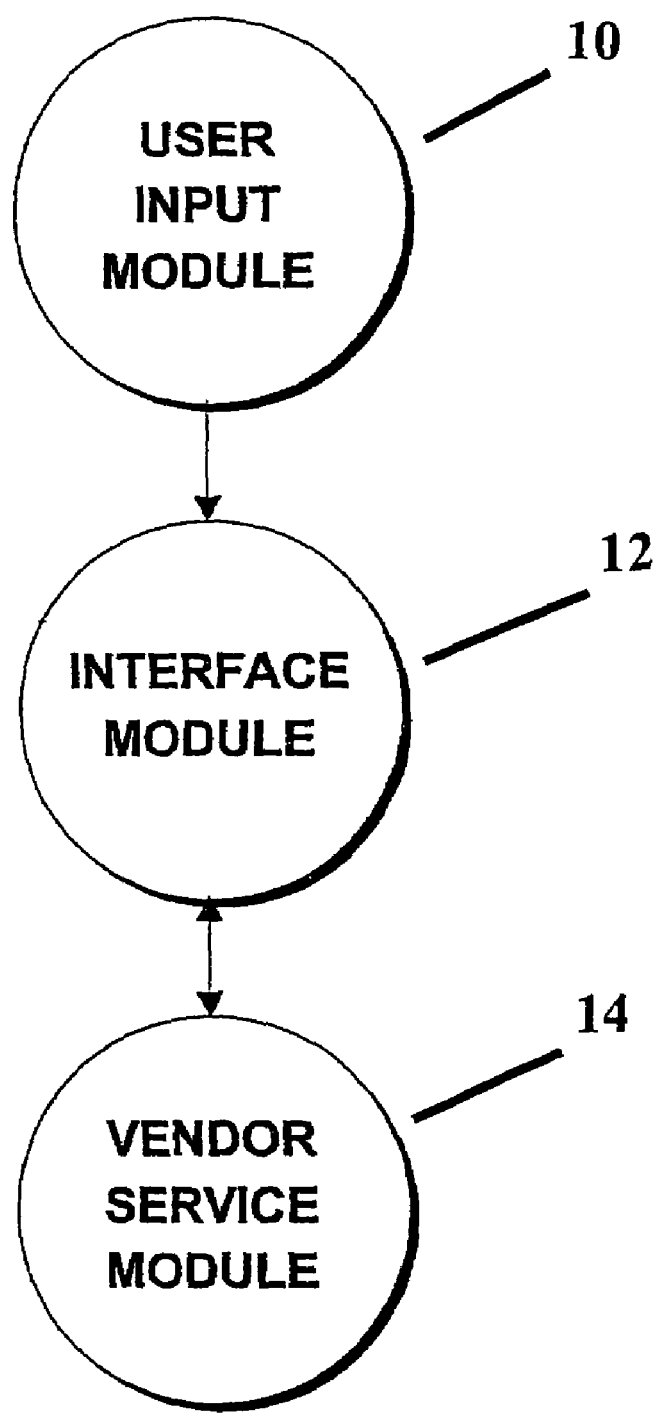
FIG. 1 is a block diagram of the primary modules implemented within the present invention.

FIG. 1 denotes a block diagram of the three primary modules implemented within the present invention, which include a user input module 10, an interface module 12 and a vendor service module 14. In the preferred embodiment, these modules are implemented in different processors, which are typically located in separate geographical areas. Alternatively, as processor system resources increase and communication capabilities improve, these modules could be consolidated into the same processor or grouped or combined into different modules. As would be understood, the functions performed by each module, whether done on separate processors or grouped into a unary system, would remain the same, and any modification to the configuration of the modules considered within the scope of the present invention.

Figure 2:
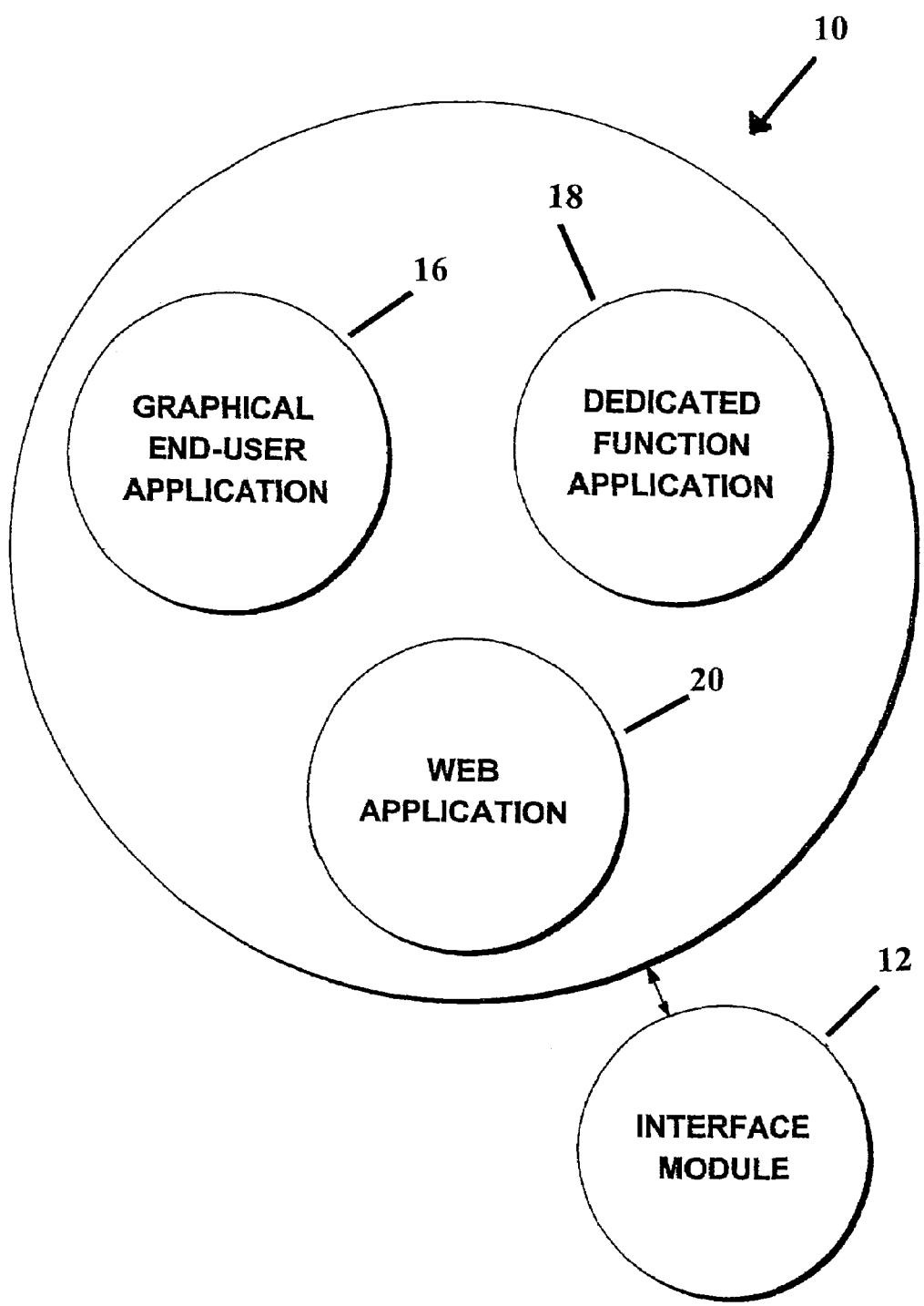
FIG. 2 is block diagram of the user input module of the present invention.

FIG. 2 is representative of the user input module 10 of the present invention. The user input module 10 provides different types of users with an appropriate interface for bundling multiple user transactions and for receiving responses from either the interface module 12 or the vendor module 14. The user input module 10 varies the implementation of the specific user input interface depending on the needs and the sophistication of the user. In the preferred embodiment, some of the typical users include resellers, such as travel agents, Internet based users and individual users transacting on dedicated computer systems such as kiosks. As demonstrated in FIG. 2, to accommodate for the needs of the different classes of users the preferred embodiment of the user input module includes a graphical end user application 16, a dedicated function application 18, and a Web application 20.

The graphical end user application 16 is typically designed for the reservation reseller, which, in the preferred embodiment is a golf tee time reseller. Typically, the reseller performs the inquiries and establishes reservations for the eventual end user. Accordingly, the primary function of the graphical end user application 16 is to provide the resellers with information in a format designed to facilitate the processing of a client's request. Because the end user does not have direct access to the information, the graphical end user application 16 disseminates information in a more textual format.

In addition to the simplified display, the graphical end user application 16 allows a golf reseller to access the reservation network of the present invention via one single software application, enter a single or multiple transaction(s) in the same format irrespective of the software supported by the vendor, and receives the processing of the transactions in a textual format for a report to the end user. By consolidating all transactions into one input transaction, the graphical end user application 16 eliminates the need for the golf reseller to implement and become proficient in multiple software applications that can only communicate with each specific reservation software platform being run by the individual vendors. Additionally, the graphical end user application 16 bundles transactions into a single communication, allowing the reseller real time processing of multiple transactions.

The Web-based application 20, unlike the graphical end user application 16, is not designed for the golf reseller, but rather is implemented for the direct end user to access multiple software platform reservation systems from one interface via the Internet or other suitable network. Because the sophistication and desires of the Web-based 20 user versus the graphical end user are different, the Web-based application 20 addresses the issues of marketability and sales by providing the user with not only textual information, but also with a graphical presentation of the information to promote the sale and processing of the service provided by the present invention. This presentation could include graphical representations of the golf courses, maps of the area, or also commentary and advertising by different entities related to the service being processed.

Although different in display format, the Web-based application 20 processes the exact same bundled transactions that the graphical end user application processes and will accept the same response from the vendor. By establishing a Web-based input application, the present invention eliminates the need for an individual user to purchase software and processing specific to reservations. Instead, the user relies on basic Internet access as the software platform for transactions.

The final user input module is the dedicated function application 18. This module provides access to the system of the present invention via terminals dedicated for this specific use. For example, in one embodiment of the dedicated service module 18, the user input modules are loaded onto automatic teller (ATM) bank machines such that a user could utilize the banking services provided by the banking machine to pay for reservations conducted by the present invention. The dedicated function application 18 implements an input format designed to appeal to the single function end user. For example, another potential embodiment would be the implementation of kiosk stand alone computers, such as in a golf pro shop, that would allow a knowledgeable user to quickly reserve tee times on that golf course or other golf courses via the system network of the present invention without having to access the Internet or call a travel agency. Accordingly, the structure and display format of the dedicated function application will vary with each potential dedicated function and its location and target consumer. As is common with all input applications of the input module, the dedicated function application 18 allows for concurrent processing of multiple transactions and does not vary the communications sent to the other module.

As has been mentioned previously, the user input module 10 of the present invention sends all transaction as bundled requests which allows the system to process the individual requests efficiently, and return the processed requests in the same bundled fashion. Accordingly, the use of bundled transactions to a system using multi-threaded technology allows for true concurrent processing of system requests from either the user input module or the vendor service module.

As would be understood by someone skilled in the relevant art, multi-thread processing technologies allows a processor to divide allotted CPU time into multiple sub-processes that are processed within one clock cycle. By bundling each request as sub-processes within a larger process, a CPU would be allowed to process multiple booking, shopping, maintenance or internal processes within one clock cycle as opposed to having process an individual request or communication in multiple clock cycles. Depending on the number of processors bundled within a single communication, this would reduce the processing time by a linear factor. Because of the multiple thread technology, an end user or vendor can bundle requests and have these requests within each bundle processed immediately and more efficiently by the system.

Figure 3:
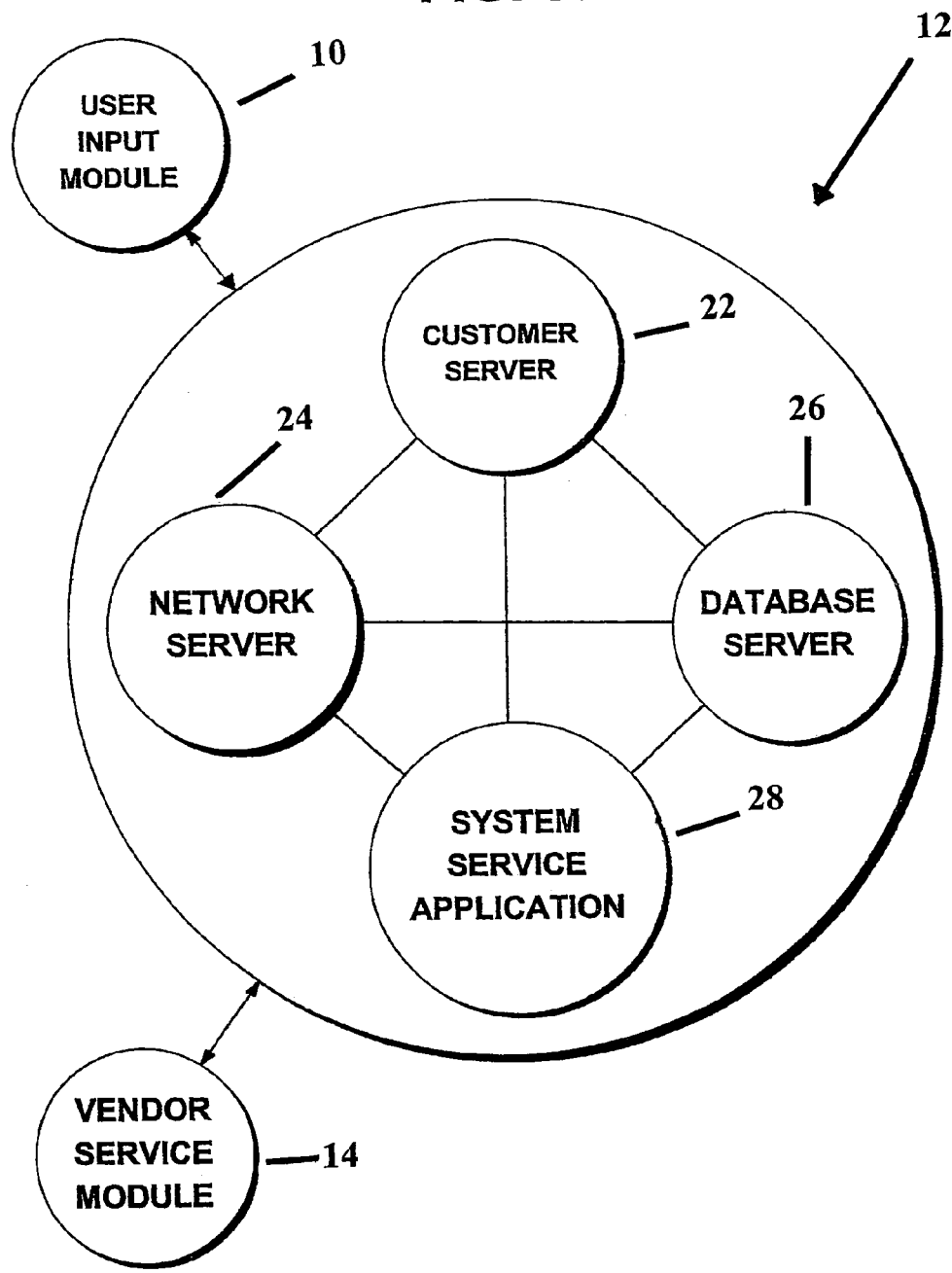
FIG. 3 is a block diagram of the interface module of the present invention.

FIG. 3 is representative of the interface module 12 of the present invention. The interface module performs three general functions: 1) the processing of transactional and informational requests from the user 2) the processing of transactional and informational requests from the vendor; and 3) the processing of various system administrative functions. The interface module performs the three basic functions through a variety of server and service applications that are all interconnected. Accordingly, each server and/or service application will be implemented in different combination for each of the various functions performed by the interface service module 12.

The first primary function performed by the interface service module 12 receives and processes bundled communications from the user input module. The bundled communication will include either an informational request that is processed internally by the interface module or a transactional request that is processed via a vendor software reservation system. As demonstrated in FIG. 2, there are several types of user input applications. In the preferred embodiment, the interface module 12 allots a separate customer server 22 to interface with each user input application. Each customer server 22 is dedicated to receiving a bundled user communication, interpreting and decoding the communication into separate transactions, and sending the transaction to an appropriate server to be processed. For example, in the event that the end user module 10 was requesting a tee time reservation, the customer server 22 would interpret this communication as a transactional request to be processed by a vendor and contacts a network server to send the request to the vendor service module. On the other hand, if the user input module 10 was only requesting an administrative report, the customer server 22 would interpret this communication as an administrative request to be processed internally and sends the transaction to the system service application to conduct appropriate administrative service. Finally, if the user input module 10 were requesting information, the customer server 22 processes this communication as an informational request to be processed internally and sends the transaction to the database server, which locates and returns the appropriate data.

The network server 24 receives decoded transactions needed to be processed by a vendor from the other servers within the interface module 12 and establishes a communication link with the appropriate vendor interface module 14. Similar to the customer server 22, the network server 24 preferably comprises multiple servers that are dedicated to establishing communication links with each of the vendor software reservation systems connected to the network. Because each vendor module may or may not be running software specifically designed to communicate directly with the interface module 12, each server within the network server 24 must be specifically programmed to correspond with and translate the standard transactions supported by the present invention into the specific protocol for each vendor reservation system. For example, one network server 24 may be dedicated to accessing a single golf course running a reservation system compatible with the exact protocol run by the present invention. Accordingly, the network server 24 would not require any additional translation programming. On the other hand, another network server 24 may be communicating with a network of other reservation systems that is not implementing a directly compatible protocol. In this case, the network server 24 would be programmed with individual translations for each transaction supported by the software platform. The translating ability of the network server 24 allows the present invention to incorporate multiple reservation software which typically prevented the prior art networks from expanding.

The database server 26 is preferably an internal system server that contains an informational database such as geographical location golf course listings, individual golf course descriptions or layout, or other information that the users or vendors request. Because an informational request is handled internally within the interface module, the database server 26 receives decoded transactions from the other servers within the interface module 12 and returns all processed requests to the appropriate server. Since the database server 26 does not have external contact with either of the other servers, there is no need for any translational or decoding ability. In the preferred embodiment, the database server 26 includes dedicated warehouse processors which contain specific formats for accessing the information more efficiently.

The system service application 28 includes administrative tools for internally regulating the system's resources, such as ensuring the proper function of each server, and also includes applications which process administrative requests from both the user input module and the vendor service module. For example, the system service application 28 processes inquiries such as billing information, produces summaries of specific user trends, and produces consumer usage reports for the individual service vendors such that they may adjust the appropriate marketing data. Similar to the database server 26, the system service application 28 processes all transactions internally and has no external contact with the other modules. As would be understood, additional or different administrative tools would be considered within the scope of the present invention.

Figure 4:
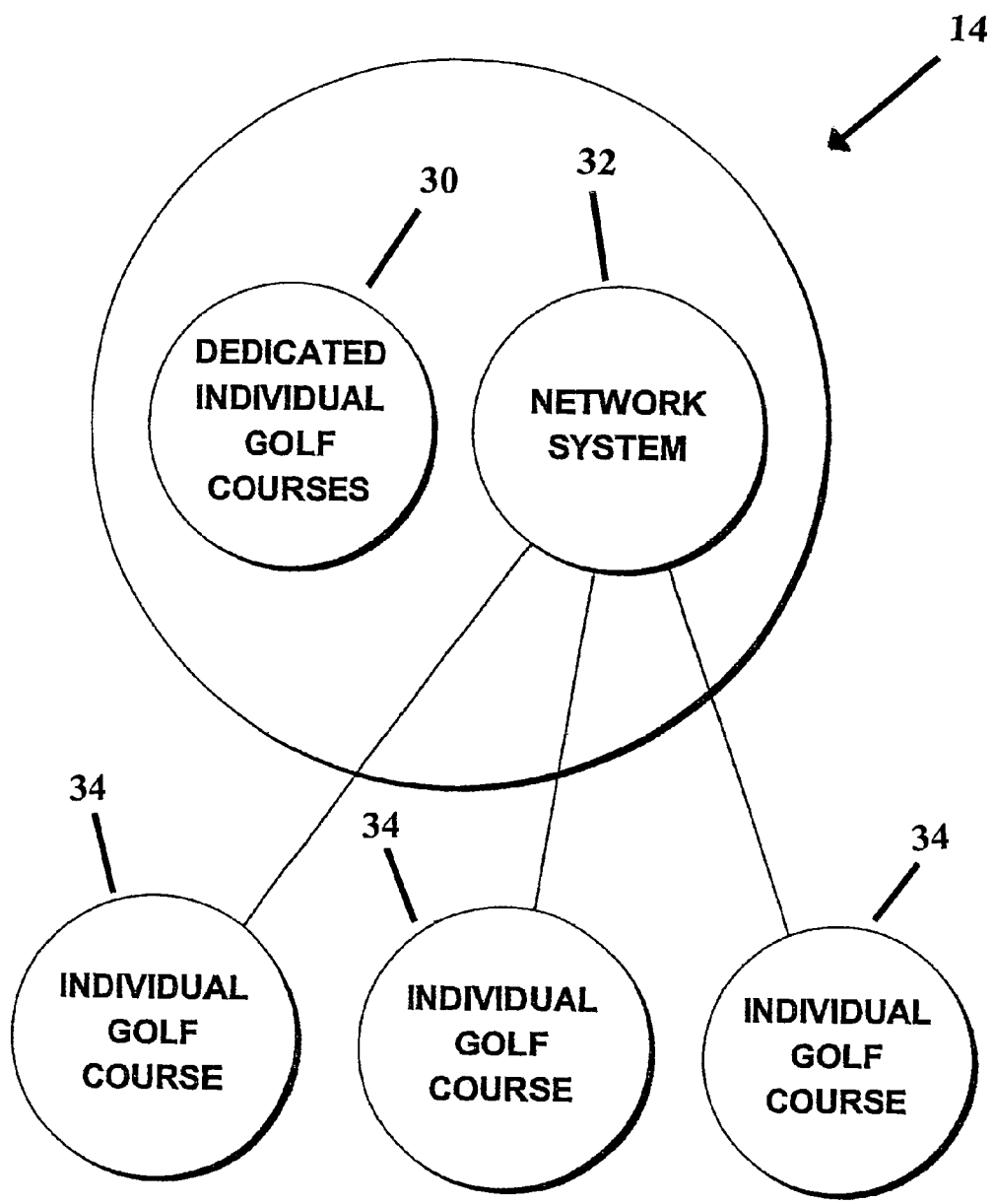
FIG. 4 is a block diagram of the vendor service module of the present invention.

FIG. 4 represents the vendor service module 14 of the present invention. The vendor service module 14 interfaces the vendor software reservation systems with the interface module 10. There is no limit as to the number of vendor service reservation systems contained within the network, nor to the number and type of vendor software platforms that the present invention will recognize. In the preferred embodiment, there are two main groupings of vendor services. The first category is the individual golf course 30 which does not require any networking abilities and typically consists of only a single PC running individualized reservation software. The present invention accesses the individual reservation system with a direct connection from the vendor service module 14 to the individual PC.

The second main group is of a golf reservation network system 32 that is connected to individual golf courses 34 which are running a reservation system unique to that network. By utilizing access to the individual golf courses 34 through the preestablished network 32, the present invention eliminates the need for a golf course 34 to have access to its tee system through two different service networks which could provide inaccurate information or competing reservations. Because the golf switch system can interface with any software platform, including networks, the integrity of the reservation system remains intact.

In some situations, a network will not support direct communications with the vendor service module. Accordingly, the network server 24 of the interface module may be directly connected to the reservation network 32 to establish a communication link.

Figure 5:
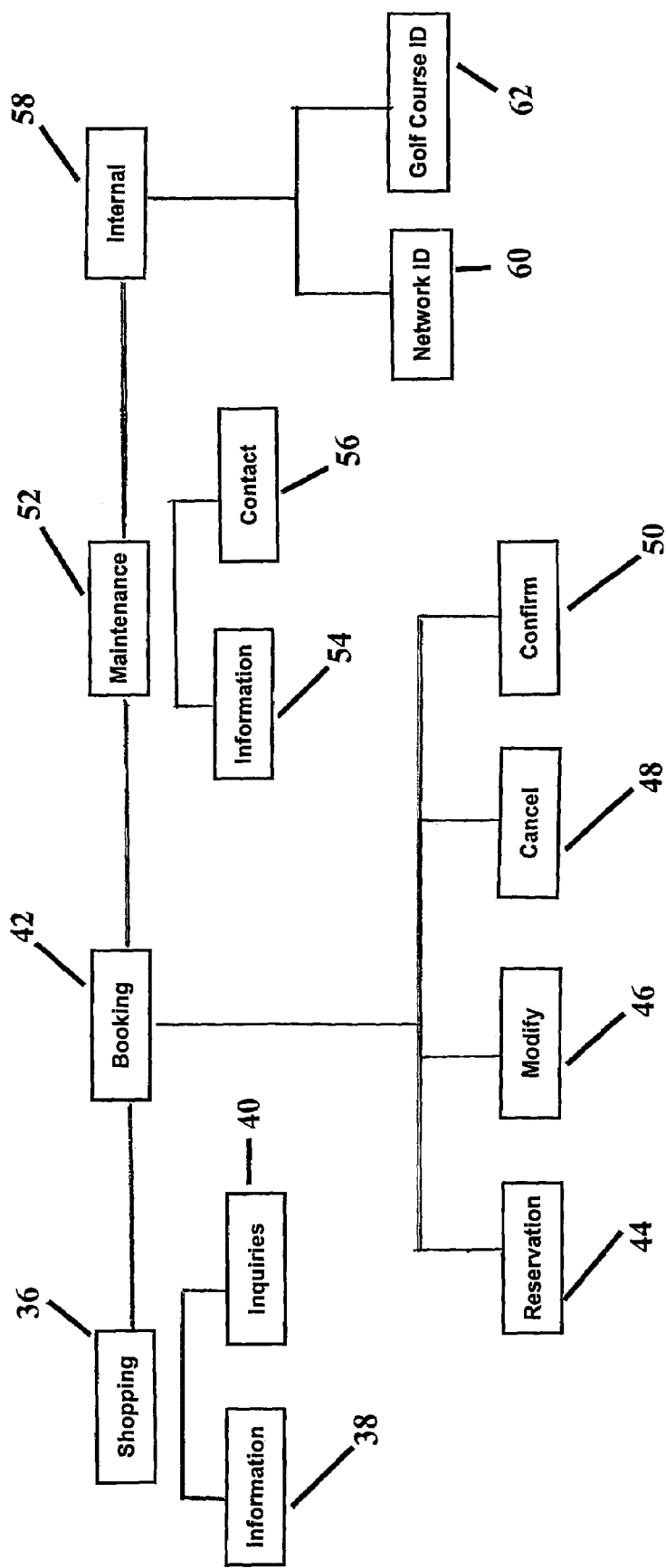
FIG. 5 is a transactional diagram of the communication classifications between the modules of the present invention.

FIG. 5 is a transactional diagram of the communications between the three modules of the present invention. By categorizing the instructions and communications into four preferred categories, each individual server of the interface module 12 can readily appropriate the server responsible for handling each type of category. The first primary category of communication between the modules is the shopping instructions 36. The shopping instructions 36 include requests from the user input module 10 to either the interface module 12 or the vendor service module 14. These transactions include retrieving information 38 as to the area market, such as courses within specific a geographic area or course listings by city or by name, and inquiries 40 as to availability of specific courses. For example, if a user requests all of the courses within the greater Phoenix area, this would be interpreted as a shopping request. Likewise, if a user requested whether a specific tee time on a specific course within the Phoenix area is available, this would be considered a shopping communication as well.

The next major category of communications between the modules are booking instructions 42. All booking instructions 42 are communications from the user input module 10 to the vendor service module 14. They include requests to book a specific tee time at a specific course 44, requests to modify a previous reservation 46, requests to cancel a previous tee time 48, and requests to verify or confirm a previous tee time reservation 50.

The third category of communications are the maintenance communications 52. Maintenance communications 52 are typically transactions from the vendor service module 14 either requesting the interface module 12 to change the information 54 stored within its database server, such as course layout descriptions or statistics, or a request to notify 56 the user of a change in previously reserved tee time.

The final communication category is the internal instructions 58 performed within the interface module that allows for performance checking or verification that all servers and applications are running properly. The internal instructions includes network ID listings 60, golf course ID listings 62, or other internal functions.

By standardizing the communications between modules, the present invention allows multiple user inputs to utilize the same instructions to access different vendors running different software platforms. Accordingly, the interface module 12 receives these transactions and processes them accordingly. FIG. 6 represents the preferred format for all communication. By following this format all communications are decoded and processed by the interface module 12 in the same manner by the decoding server. In the preferred embodiment, the communication protocol includes a header segment 64, an originating system code 66, a message 68, a time stamp of transaction origination 70, a time stamp of response 72, and a user ID 74. As would be understood, this template could be modified and still be considered within the scope of the present invention.

Figure 7:
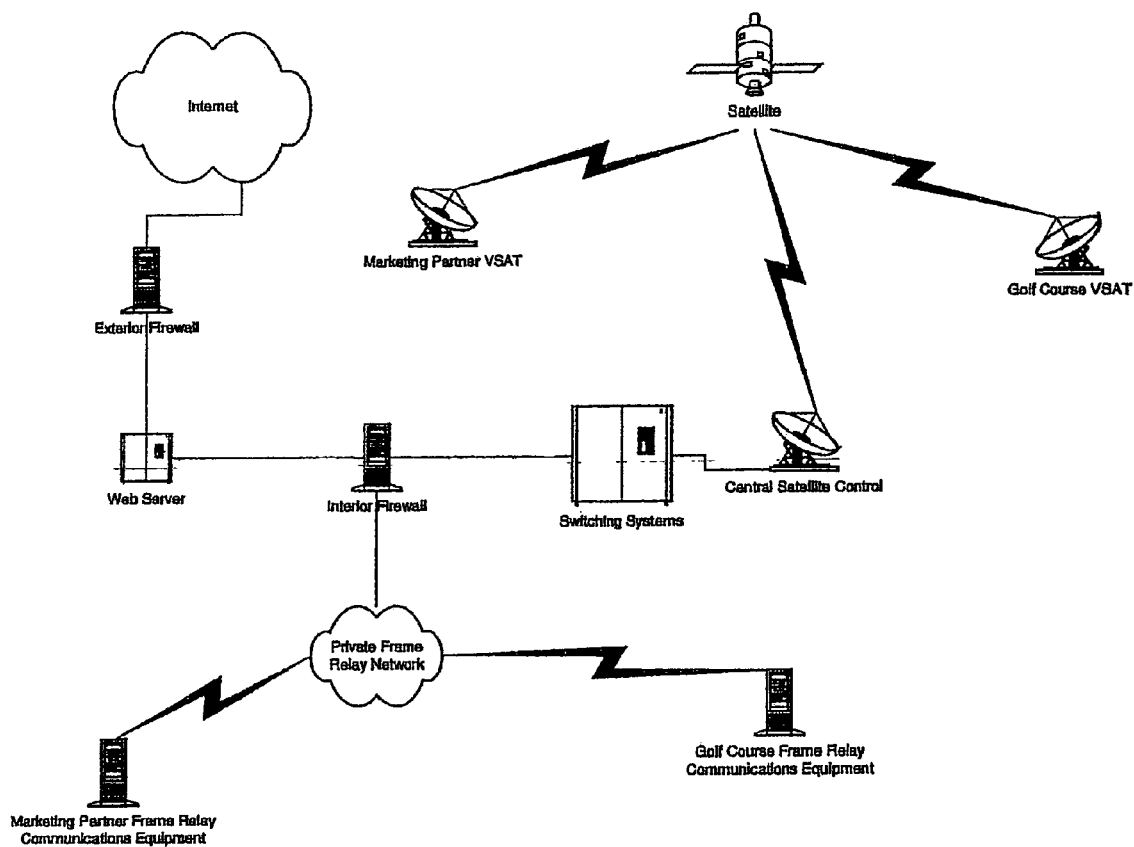
FIG. 7 is block diagram of the networking overview of the communication links of the present invention.

FIG. 7 is a block diagram of the networking overview of the communication links within the present invention. The first communication format between either the user input module 10 and the interface module 12 or the vendor service module 14 and the interface module 12 is via the Internet or other wide area network. Typically, the external module 10, 14 has a server connected to a network, such as the Internet 76, also connected to another server attached to the interface module.

The second type of communication network is a direct line, or frame to frame relay. A typical example would be a direct phone line 78 connection or a direct cable line from one server of a module 10, 14 to the interface module 12. The direct line communication method allows for a continuous communication link between all modules of the present invention.

The final network connection method is a video-satellite connection such that the one module 10, 14 would have an appropriate dish 78 to connect to a satellite feed 80 which would then feed it to an appropriate dish 78 at the interface module 12. Accordingly, although there would be no physical connection between the two, the signal beamed from the satellite 80 would establish the same link.

The seamless user/service reservation network of the present invention also incorporates a unique method of establishing an all encompassing reservation system. As mentioned in the above-mentioned discussion, the current prior art reservation systems in the golfing industry cannot accommodate multiple software platforms. Additionally, each prior art reservation system has its own unique user interface. The present invention includes a method of supporting multiple user inputs incorporating identical transactional protocols which are connected, via an interface, to multiple vendor software reservation platforms. Currently, the golf tee time reservation industry cannot incorporate both the translational and communication functions into one single reservation network. The present invention provides the industry with such a method.

As would be understood, the present invention is directed toward a golf tee time reservation system. As would be understood, this system would be applicable in a similar specific time reservation industry such a ski school reservation or other similar industry.

In the foregoing specification, the present invention is described with reference to the specific exemplary embodiments of a golf reservation network. As would be understood it would be considered within the scope of the present invention to include additional industry reservation networks that could accommodate specific time reservation systems that are incorporated into a network supporting multiple platforms reservations systems. One such example is a ski school reservation system which would have the need to reserve specific times on different ski slopes with each system running a different reservation system.

The invention is considered to have been described in such full, clear, concise and exact terms as to enable a person of ordinary skill in the art to make and use the same. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit and scope of the invention. The specification and drawings are, therefore, to be regarded in an illustrative rather than restrictive sense. Accordingly, it is not intended that the invention be limited except as may be necessary in view of the appended claims or their equivalents, which particularly point out and distinctly claim the subject matter applicant regards as its invention.

We claim:

1. Golf tee-time reservation apparatus for implementing seamless real time access concurrently to a plurality of disparate individual golf course reservation systems situated at different locations, at least some of which use different protocols, said apparatus comprising:

a plurality of user input modules distributed throughout a wide geographic area including at sites remote from one another, each user input module having an interface capable of sending one or more tee-time requests concurrently to said plurality of disparate individual gold course reservation system; and an interface module having a data link with each of said plurality of user input modules for concurrently receiving one or more tee-time requests to said plurality of disparate individual golf course reservation systems as real time transactions, said interface module having a data link connection with each of said plurality of disparate individual golf course reservation systems and being arranged to interface with each different protocol of said plurality of disparate individual golf course reservation systems to effect acceptance of one or more tee-time requests at the plurality of disparate individual golf course reservation systems to which said one or more tee-time requests are directed, and said interface module being arranged to concurrently process one or more tee-time requests sent from a single user input module to said plurality of disparate individual golf course reservation systems.

2. The golf tee-time reservation apparatus of claim 1, wherein each said user input module comprises a networked based interface.

3. The golf tee-time reservation apparatus of claim 2, wherein said networked based interface is the Internet.

4. The golf tee-time reservation apparatus of claim 1, wherein said user input module is a terminal that receives said plurality of tee-time requests.

5. The golf tee-time reservation apparatus of claim 4, wherein said terminal comprises a graphical user interface.

6. The golf tee-time reservation apparatus of claim 4, wherein said terminal displays information to a user.

7. The golf tee-time reservation apparatus of claim 1, wherein said interface module comprises one or more computer servers.

8. The golf tee-time reservation apparatus of claim 7, wherein said one or more computer servers is a database server.

9. The golf tee-time reservation apparatus of claim 8, wherein said database server provides information upon request.

10. The golf tee-time reservation apparatus of claim 7, wherein said one or more computer servers is a system service application server.

11. The golf tee-time reservation apparatus of claim 10, wherein said system service application server comprises administrative tools for regulating system resources.

12. The golf tee-time reservation apparatus of claim 10, wherein said system service application server provides administrative reports.

13. The golf tee-time reservation apparatus of claim 7, wherein said one or more computer servers is a network server.

14. The golf tee-time reservation apparatus of claim 7, wherein said one or more computer servers is a customer server.

15. The golf tee-time reservation apparatus of claim 14, wherein said customer server administers said plurality of tee-time requests by sending said plurality of tee-time requests to said one or more computer servers.

16. The golf tee-time reservation apparatus of claim 15, wherein said customer server comprises protocol translation software.

* * * * *